United States Patent
Park et al.

(10) Patent No.: US 10,703,513 B2
(45) Date of Patent: Jul. 7, 2020

(54) SUPPORT EQUIPMENT FOR COLLECTING REUSABLE ROCKET

(71) Applicant: Korea Aerospace Research Institute, Daejeon (KR)

(72) Inventors: Kwang Kun Park, Daejeon (KR); Young Suk Jung, Daejeon (KR); Kie Joo Cho, Daejeon (KR)

(73) Assignee: KOREA AEROSPACE RESEARCH INSTITUTE (KR)

( * ) Notice: Subject to any disclaimer, the term of this patent is extended or adjusted under 35 U.S.C. 154(b) by 304 days.

(21) Appl. No.: 15/647,025

(22) Filed: Jul. 11, 2017

(65) Prior Publication Data

US 2018/0022477 A1 Jan. 25, 2018

(30) Foreign Application Priority Data

Jul. 20, 2016 (KR) .................. 10-2016-0091914

(51) Int. Cl.
*B64G 5/00* (2006.01)
*B64G 1/00* (2006.01)
*B64G 1/14* (2006.01)

(52) U.S. Cl.
CPC .............. *B64G 5/00* (2013.01); *B64G 1/002* (2013.01); *B64G 1/14* (2013.01)

(58) Field of Classification Search
CPC ... B64G 5/00; B64G 1/002; B64F 5/00; B64F 1/00; B64F 1/12; B64F 1/18; B64F 1/20; B66F 3/28; B66F 7/00; B66F 7/0691

USPC .................. 248/519, 523, 188.7, 346.03
See application file for complete search history.

(56) References Cited

U.S. PATENT DOCUMENTS

| | | | |
|---|---|---|---|
| 5,667,167 A | 9/1997 | Kistler | ............ B64F 5/00 |
| 9,387,940 B2 * | 7/2016 | Godzdanker | ......... B64F 1/125 |
| 10,093,433 B2 * | 10/2018 | Knudsen | ............ B64G 5/00 |
| 2016/0170416 A1 * | 6/2016 | Chen | ........... B64C 39/024 |
| | | | 701/8 |
| 2017/0139409 A1 * | 5/2017 | Clarke | ......... B64C 39/024 |

OTHER PUBLICATIONS

MRISAR Institute of Science, Art & Robotics Robot Arms Made and Loaned for the Last Mimzy Movie Jan. 29, 2014 https://www.youtube.com/watch?v=bz8lenCFQO4 (Year: 2014).*

* cited by examiner

*Primary Examiner* — Richard G Davis
(74) *Attorney, Agent, or Firm* — Hayes Soloway P.C.

(57) ABSTRACT

Disclosed is support equipment for collecting a reusable rocket, the support equipment including a plurality of supports located on a landing platform and spaced apart from one another, a contact support pad having a contacting face to contact a reusable rocket when the reusable rocket is landing, and connected to each of the supports to secure the reusable rocket, and a distance sensor configured to sense a position of the reusable rocket or the contact support pad, wherein each of the supports is configured to move the contact support pad based on information on a distance measured by the distance sensor, and the contact support pad is configured to secure the reusable rocket when the reusable rocket has landed, in order to prevent damage of the reusable rocket.

12 Claims, 7 Drawing Sheets

SUPPORT EQUIPMENT FOR COLLECTING REUSABLE ROCKET

CROSS-REFERENCE TO RELATED APPLICATION(S)

This application claims the priority benefit of Korean Patent Application No. 10-2016-0091914 filed on Jul. 20, 2016, in the Korean Intellectual Property Office, the disclosure of which is incorporated herein by reference for all purposes.

BACKGROUND

1. Field

One or more example embodiments relate to support equipment for collecting a reusable rocket and, more particularly, to support equipment for collecting information on a reusable rocket, controlling supports based on the collected information, and securing the reusable rocket to safely collecting the reusable rocket when the reusable rocket lands.

2. Description of Related Art

Rockets may require a strong propulsion force to overcome gravity and fly beyond the atmosphere. Due to a characteristic that the propulsion force increasing proportionally to an amount of propellant emitted from the rocket, the rocket may carry a large amount of propellant and thus, a great portion of weight of the rocket may be a weight of the propellant. When a total weight of the rocket is reduced, the rocket may be driven farther and faster using the same propulsion force.

In order to develop a desirable rocket, a weight of a rocket body may be reduced to increase a payload. To design such an efficient rocket, the rockets have been developed in a variety of structures. In general, the rockets may be provided in a long cylinder shape and a form of two multi-stage, for example, two-stage and three-stage structures. Each stage may include an engine and a propellant. When the propellant is consumed at each stage, the rocket may separate and discard the corresponding stage, thereby obtaining a speed at which a payload is to be input to an orbit.

The stages of the rocket have been used at a single time, and then discarded. However, in an effort to significantly reduce the cost of launching rockets, methods of collecting the stages of the rockets are actively being developed.

A device for collecting rockets stages using a net is disclosed in U.S. Pat. No. 5,667,167 filed Sep. 2, 1994, entitled "Methods and apparatus for reusable launch platform and reusable spacecraft".

SUMMARY

An aspect provides contact support pads to secure a reusable rocket at the same height when the reusable rocket is landing.

An aspect provides support equipment to prevent a reusable rocket from falling.

An aspect provides support equipment controlled by receiving landing information of a reusable rocket through communication with the reusable rocket when the reusable rocket is landing.

An aspect provides support equipment that maintains a predetermined distance from a reusable rocket when the reusable rocket is landing and secures the reusable rocket after the landing.

An aspect provides support equipment that removes a supporting structure from a lower portion of a reusable rocket to improve a flight performance and is used as the supporting structure.

An aspect provides support equipment to increase a rate of success in collecting a reusable rocket.

An aspect provides support equipment to ensure a stable landing by offsetting an error between a calculated landing point and an actual landing point of a reusable rocket.

An aspect provides support equipment for collecting a reusable rocket by sensing a support pressure of a support pad and controlling an appropriate supporting force so as to prevent damage of the reusable rocket.

As aspect provides support equipment to be located on the sea, land, a vessel, or a vehicle to collect a reusable rocket.

According to an aspect, there is provided support equipment for collecting a reusable rocket, the support equipment including a plurality of supports located on a landing platform and spaced apart from one another, a contact support pad having a contacting face to contact a reusable rocket when the reusable rocket is landing, and connected to each of the supports to secure the reusable rocket, and a distance sensor configured to sense a position of the reusable rocket or the contact support pad, wherein each of the supports is configured to move the contact support pad based on information on a distance measured by the distance sensor, and the contact support pad is configured to secure the reusable rocket when the reusable rocket has landed, in order to prevent damage of the reusable rocket.

The distance sensor may include a first sensor configured to sense a distance between the contact support pad and a surface of the reusable rocket and a second sensor configured to sense a height of the contact support pad, and the supports may each be configured to move the contact support pad horizontally based on information sensed by the first sensor and adjust the height of the contact support pad based on information sensed by the second sensor.

The distance sensor may include a third sensor configured to measure a pressure applied to the contact support pad, and the supports may each be controlled based on information sensed by the third sensor.

The support equipment may further include a landing sensor configured to sense a time at which the reusable rocket lands on the landing platform.

The supports may each include a support member configured to tilt to move the contact support pad and an angle adjusting member configured to rotatably adjust an inclination angle between the support member and the landing platform, the supporting member and the angle adjusting member are extendable, one end of the supporting member may be rotatably hinge-connected to the landing platform, the other end of the supporting member may be rotatably connected to the contact support pad, one end of the angle adjusting member may be rotatably hinge-connected to the landing platform, and the other end of the angle adjusting member may be rotatably connected to the support member.

The supports may each include a first extended portion configured to adjust a height of the contact support pad and a second extended portion configured to adjust an inclination angle of the corresponding support, the first flexible element may be configured to extend such that the contact support pad of each of the supports is located at the same height, and the second flexible element may be configured to extend such that the contact support pad moves horizontally.

According to another aspect, there is also provided support equipment for collecting a reusable rocket, the support equipment including a transceiver configured to receive information from a reusable rocket, a controller configured to receive the information from the transceiver and create a command, a plurality of contact support pads configured to contact the reusable rocket based on the command, and a plurality of supports configured to position the contact support pads toward the reusable rocket and spaced apart from one another based on the command of the controller while the reusable rocket is landing, wherein the controller is configured to control movements of the supports and the contact support pads based on a position of the reusable rocket.

When the reusable rocket is at a landing-detectable height, the controller may be configured to control the supports and the contact support pads such that the contact support pads are positioned toward the reusable rocket at predetermined intervals, and to control contacting faces of the contact support pads to face the reusable rocket.

When the reusable rocket is at a landing-detectable height, the controller may be configured to control the supports such that the contact support pads are adjusted to be at the same height, and to control contacting faces of the contact support pads to face the reusable rocket.

When the reusable rocket lands on a landing platform, the controller may be configured to control the supports and the contact support pads such that the contact support pads approach the reusable rocket to secure the reusable rocket.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected," "coupled," or "joined" to another component, a third component may be "connected," "coupled," and "joined" between the first and second components, although the first component may be directly connected, coupled or joined to the second component.

Figure 1A:
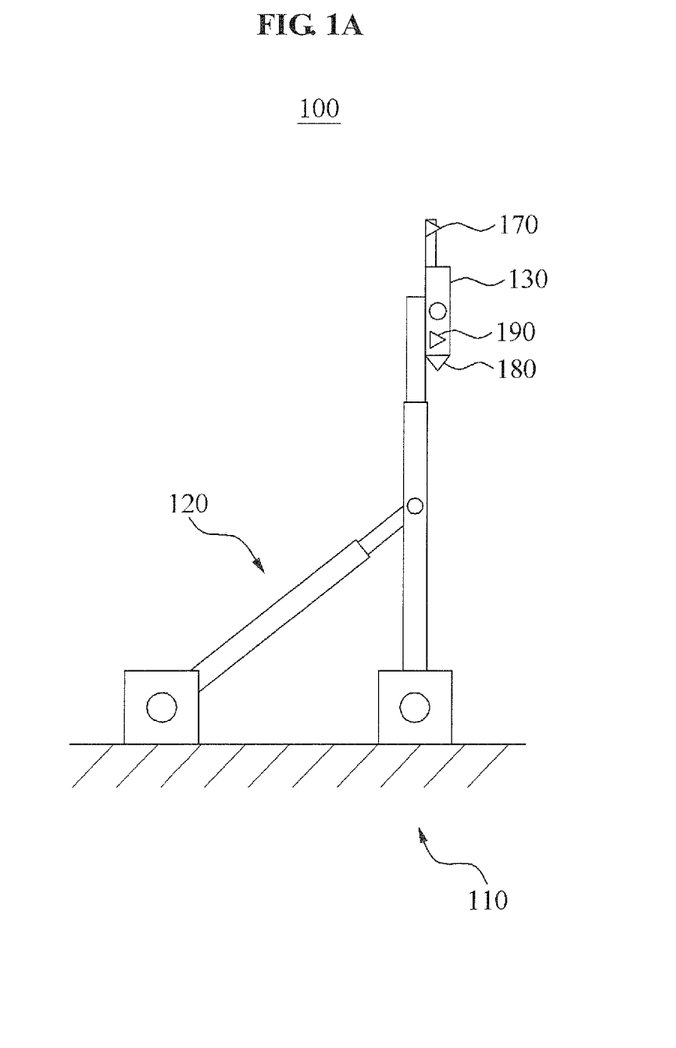
FIGS. 1A and 1B illustrate examples of support equipment for collecting a reusable rocket according to an example embodiment.
Figure 1B:
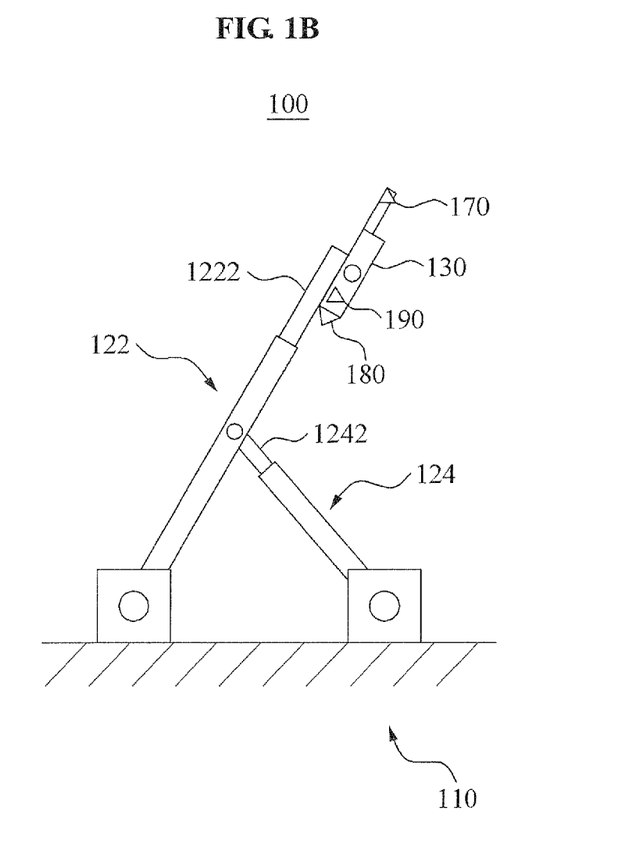
Figure 2:
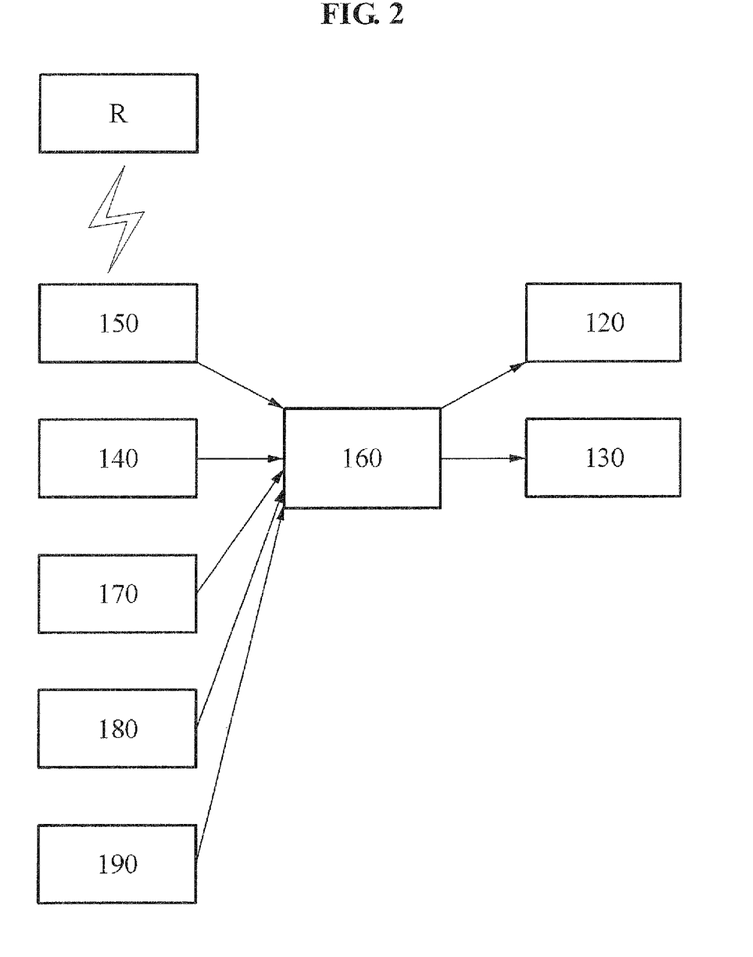
FIG. 2 illustrates an example of support equipment for collecting a reusable rocket according to an example embodiment.

FIGS. 1A and 1B illustrate examples of support equipment for collecting a reusable rocket according to an example embodiment and FIG. 2 illustrates an example of support equipment for collecting a reusable rocket according to an example embodiment.

Referring to FIGS. 1A through 2, support equipment 100 for collecting a reusable rocket may include a landing platform 110, a support 120, a contact support pad 130, a distance sensor, a landing sensor 140, a transceiver 150, and a controller 160.

The landing platform 110 may be installed on, for example, a ship, a movable vehicle, a building, or a ground and thus, the support equipment 100 may be located in various spaces.

The contact support pad 130 may include a contacting face configured to contact a reusable rocket R while the reusable rocket R is landing. The contact support pad 130 may be connected to the support 120 to secure the reusable rocket R. The contacting face of the contact support pad 130 contacting the reusable rocket R may be formed of a shock-absorbing material.

Specifically, the contact support pad 130 may be provided to be rotatable at an upper end portion of the support 120. The contacting face of the contact support pad 130 in contact with the reusable rocket R may be formed on a shock-absorbing material to prevent a damage on a surface of the reusable rocket R when the contact support pad 130 contacts the reusable rocket R. Also, the contact support pad 130 may be provided in a form of a roller. The contact support pad 130 may include a third sensor 190 configured to measure a contacting pressure applied when the contact support pad 130 contacts the reusable rocket R. Based on a signal of the third sensor 190, the contact support pad 130 may support the reusable rocket R with an appropriate amount of force so as to prevent a damage of the reusable rocket R. The contact support pad 130 may rotate relative to the support 120 such that the reusable rocket R is secured by the controller 160. In this example, the contacting face may face the reusable rocket R. That is, the contact support pad 130 may rotate in response to a movement of the support 120.

One or more supports 120 may be located on the landing platform 110 and spaced apart from one another. The supports 120 may move a plurality of contact support pads 130 toward the reusable rocket R. Also, the supports 120 may be arranged on the landing platform 110 in a circumferential shape.

For example, the support 120 may be formed upright on the landing platform 110. As illustrated in FIGS. 1A and 1B, the support 120 may include a support member 122 configured to tilt to move the contact support pad 130, and an angle adjusting member 124 configured to rotatably adjust an inclination angle between the support member 122 and the landing platform 110. The support member 122 may include a first extended portion 1222 extended to adjust a height of the contact support pad 130 using, for example, a gear, a hydraulic pressure, a pneumatic pressure, and a motor. Also, the angle adjusting member 124 may include a second extended portion 1242 extended to adjust an inclination angle of the support member 122 using, for example, a gear, a hydraulic pressure, a pneumatic pressure, and a motor.

The first extended portion 1222 may be extended such that the contact support pads 130 are positioned at the same height. The second extended portion 1242 may be extended such that the contact support pad 130 move horizontally.

As illustrated in FIG. 1A, the angle adjusting member 124 and the contact support pad 130 may be disposed on opposite sides. Also, as illustrated in FIG. 1B, the angle adjusting member 124 and the contact support pad 130 may be disposed on the same side.

One end portion of the support member 122 or the angle adjusting member 124 may be rotatably hinge-connected to the landing platform 110, and the hinge portion may be used to adjust a speed of the support 120 by using a motor or a gear connected to the motor. The other end portion of the support member 122 may be rotatably connected to the contact support pad 130 to rotate the contact support pad 130. The other end portion of the angle adjusting member 124 may be rotatably connected to the support member 122.

The distance sensor may sense location information of the contact support pad 130 or the reusable rocket R to allow the controller 160 to control the support 120 or the contact support pad 130.

Specifically, the distance sensor may include a first sensor 170 configured to sense a distance between the contact support pad 130 and a surface of the reusable rocket R, and a second sensor 180 configured to sense a height of the contact support pad 130. The first sensor 170 may be, for example, an ultrasonic sensor.

As illustrated in FIGS. 1A and 1B, the first sensor 170, the second sensor 180, and the third sensor 190 may be included in the contact support pad 130.

Referring to FIG. 2, the transceiver 150 may communicate with the reusable rocket R based on, for example, laser, ultrasonic wave, electromagnetic wave-based communication method to receive height information of the reusable rocket R or receive the height information using other various methods. The transceiver 150 may transfer the height information to the controller 160.

The landing sensor 140 may be an acceleration sensor configured to sense an impact, and may sense a time at which the reusable rocket R lands on the landing platform 110. Landing information collected by the landing sensor 140 may be transferred to the controller 160.

The controller 160 may also receive location information of the reusable rocket R or the contact support pad 130 sensed by the distance sensor.

The controller 160 generates a command to control the support 120 or the contact support pad 130 based on information collected by the transceiver 150, the distance sensor, the third sensor 190, for example, a contact support pressure sensor, and the landing sensor 140.

A face of the reusable rocket R in contact with the contact support pad 130 may be protected using a stiffener or formed with a relatively high stiffness in comparison to another portion.

The reusable rocket R may include a reverser. The controller 160 may control a landing speed of the reusable rocket R through communication.

Hereinafter, an operation of support equipment for collecting a reusable rocket will be described with reference to FIGS. 3A through 4.

Figure 3A:
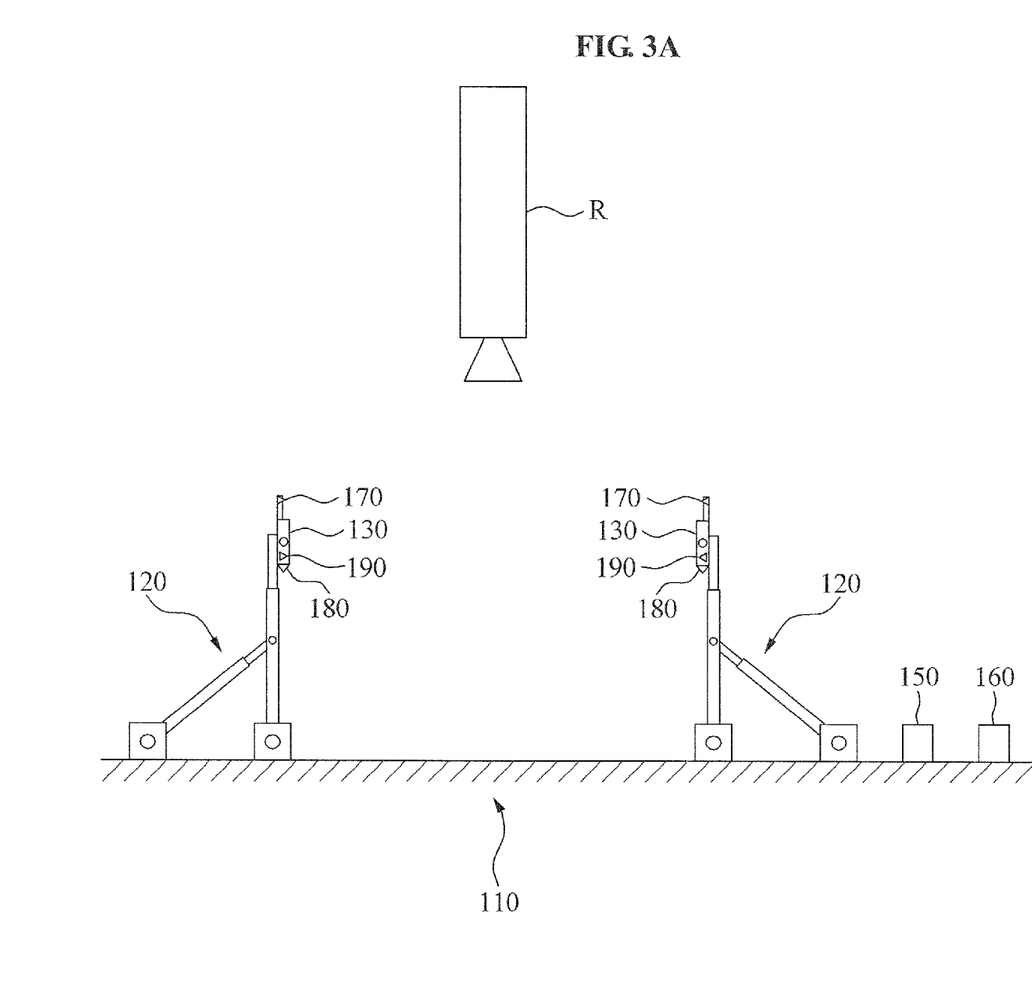
FIGS. 3A through 3C illustrate examples of an operation of support equipment for collecting a reusable rocket according to an example embodiment.

FIG. 3A illustrates an initial state of the support equipment 100.

Referring to FIG. 3A, the controller 160 may control an operation of the support 120 or the contact support pad 130 based on height information collected by the transceiver 150. When a height of the reusable rocket R does not reach a landing-detectable height, for example, a height at which the controller 160 starts to communicate with the transceiver 150 or a predetermined height, the controller 160 may maintain a stationary state of the support 120 or the contact support pad 130.

Figure 3B:
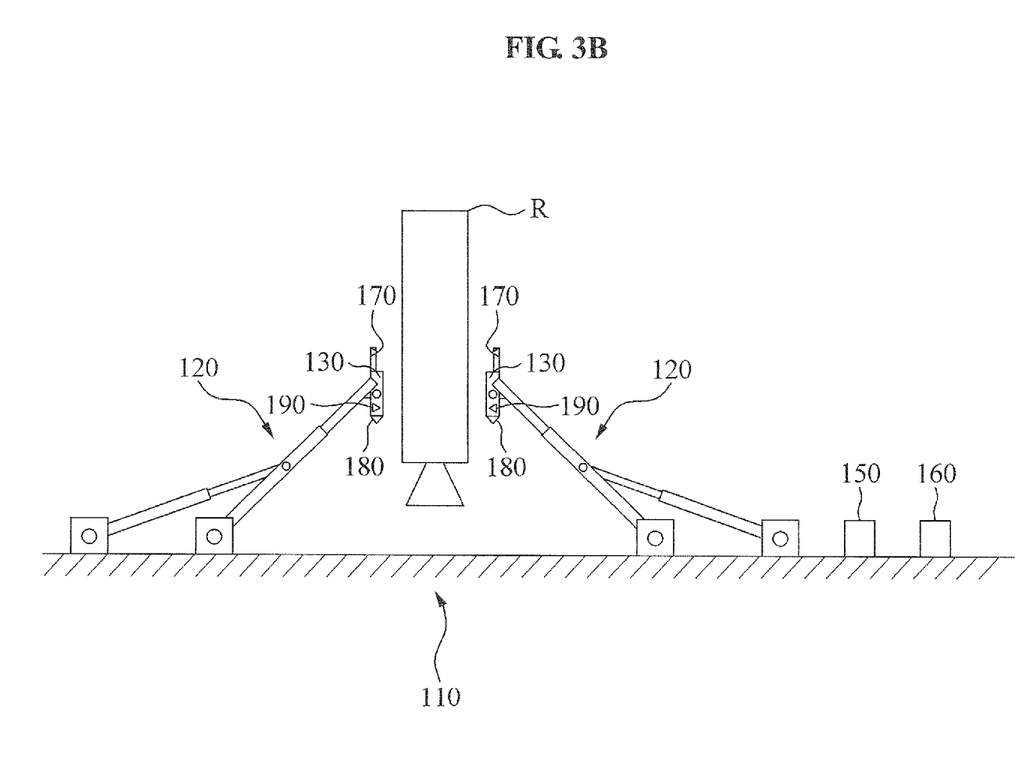

FIG. 3B illustrates the support equipment 100 operating in response to the reusable rocket R reaching the landing-detectable height.

Referring, to FIG. 3B, when the reusable rocket R reaches the landing-detectable height using the transceiver 150, the controller 160 controls the support 120 or the contact support pad 130 such that the contact support pad 130 approaches the reusable rocket R.

For example, based on a control of the controller 160, the support member 122 may tilt in response to the angle adjusting member 124 extending such that the contact support pad 130 approaches the reusable rocket R when the reusable rocket R is landing. In response to the support member 122 tilting, the contact support pad 130 may approach the reusable rocket R. Also, the controller 160 may control the contact support pad 130 to rotate such that the contacting face faces the reusable rocket R. Also, the first sensor may measure spaces between the contact support pads 130 and the reusable rocket R such that the contact support pads 130 are spaced apart from the reusable rocket R at the same intervals. The controller 160 may control the support member 122 or the angle adjusting member 124 based on information on the measured spaces. The support member 122 or the angle adjusting member 124 may tilt and rotate to move the contact support pad 130 such that the contact support pad 130 is spaced apart from the reusable rocket R. The space between the contact support pad 130 and the reusable rocket R may vary based on an altitude of the reusable rocket R. For example, when the altitude of the reusable rocket R decreases, the space between the contact support pad 130 and the reusable rocket R may also decrease.

Figure 3C:
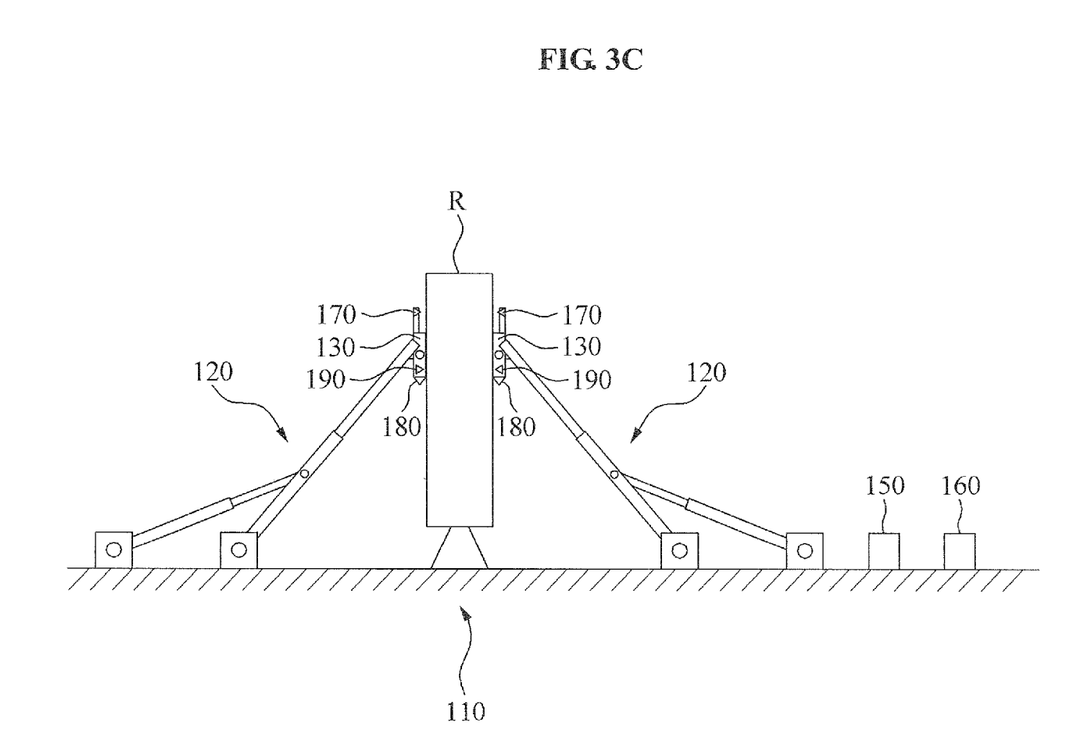

FIG. 3C illustrates the reusable rocket R having landed.

Referring to FIG. 3C, when the reusable rocket R lands on the landing platform 110, the controller 160 controls the support 120 to operate such that the contact support pad 130 secures the reusable rocket R to prevent the reusable rocket R from falling while being in contact with the reusable rocket R.

Specifically, when the reusable rocket R lands on the landing platform 110, the landing sensor 140 may sense an impact due to the landing of the reusable rocket R and transfer landing information of the reusable rocket R to the controller 160. When the landing information is received, the controller 160 may control the support member 122 and the angle adjusting member 124 so as to move the contact support pad 130 toward a surface of the reusable rocket R. Through this, the contact support pad 130 may secure the reusable rocket R and then support the reusable rocket R. Contact pressure information of the third sensor 190 included in the contact support pad 130 may be transferred to the controller 160. Also, an amount of extension and rotation of the support member 122 and the angle adjusting member 124 may be adjusted such that the reusable rocket R is supported by an appropriate binding force.

Figure 4:
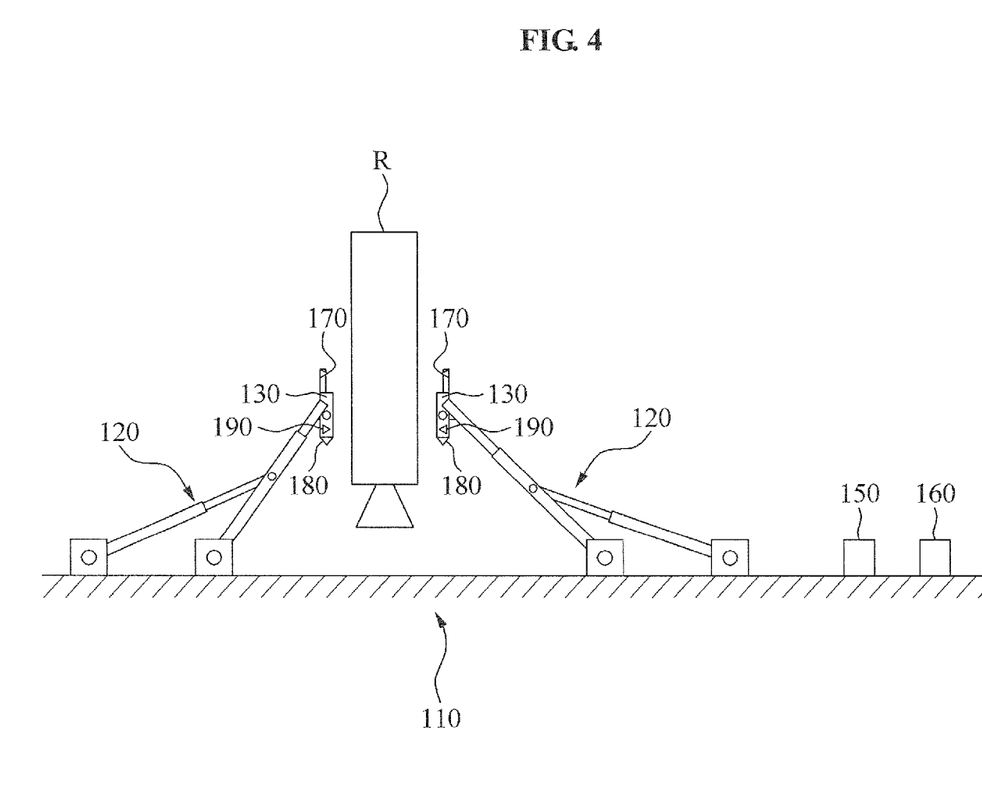
FIG. 4 illustrates an example of an operation of support equipment for collecting a reusable rocket according to an example embodiment.

FIG. 4 illustrates a case in which the reusable rocket R incorrectly lands on a landing point of the landing platform 110.

Referring to FIG. 4, even when the reusable rocket R does not land on an accurate point, the support 120 may maintain an identical interval between the contact support pad 130 and the reusable rocket R. Also, the support 120 may maintain the contact support pads 130 at the same height.

Specifically, the controller 160 may collect height information of the contact support pads 130 using the second sensor 180. Also, the controller 160 may allow the First extended portions 1222 and the second extended portions 1242 to extend or rotatably adjust such that the contact support pads 130 are positioned at the same height.

The support 120 and the controller 160 may equalize the heights of the contact support pads 130 and the spaces between the contact support pads 130 and the surface of the reusable rocket R. Also, the support 120 and the controller 160 may reduce the spaces between the contact support pads 130 and the surface of the reusable rocket R according to a decrease in the altitude of the reusable rocket R. Through this, the reusable rocket R may stably land on the landing platform 110.

According to an example embodiment, it is possible to provide contact support pads to secure a reusable rocket at the same height when the reusable rocket is landing.

According to an example embodiment, it is possible to provide support equipment to prevent a reusable rocket from falling.

According to an example embodiment, it is possible to provide support equipment controlled by receiving landing information of a reusable rocket through communication with the reusable rocket when the reusable rocket is landing.

According to an example embodiment, it is possible to provide support equipment that maintains a predetermined distance from a reusable rocket when the reusable rocket is landing and secures the reusable rocket after the landing.

According to an example embodiment, it is possible to provide support equipment that removes a supporting structure from a lower portion of a reusable rocket to improve a flight performance and is used as the supporting structure.

According to an example embodiment, it is possible to provide support equipment to increase a rate of success in collecting a reusable rocket.

According to an example embodiment, it is possible to provide support equipment to ensure a stable landing by offsetting an error between a calculated landing point and an actual landing point of a reusable rocket.

According to an example embodiment, it is possible to provide support equipment for collecting a reusable rocket by sensing a support pressure of a support pad and controlling an appropriate supporting force so as to prevent a damage of the reusable rocket.

According to an example embodiment, it is possible to provide support equipment to be located on the sea, the land, a vessel, or a vehicle to collect a reusable rocket.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. Support equipment for collecting a reusable rocket, the support equipment comprising:
   a plurality of moveable and extendable supports located on a landing platform and spaced apart from one another;
   a rotatably and pivotally mounted contact support pad having a contacting face to contact a reusable rocket when the reusable rocket is landing, and connected to each of the supports to secure the reusable rocket; and
   a distance sensor configured to sense a position of the reusable rocket or the contact support pad,
   wherein each of the supports is configured to move and extend separately from the other supports and to move its rotatably and pivotally mounted contact support pad based on information on a distance measured by the distance sensor, such that the contact support pad of each of the supports is located at a same height, and
   the rotatably and pivotally mounted contact support pads are configured to secure the reusable rocket when the reusable rocket has landed, in order to prevent a damage of the reusable rocket.

2. The support equipment of claim 1, wherein the distance sensor includes:
   a first sensor configured to sense a distance between the rotatably and pivotally mounted contact support pad and a surface of the reusable rocket; and
   a second sensor configured to sense a height of the rotatably and pivotally mounted contact support pad, and
   the supports are each configured to move the rotatably and pivotally mounted contact support pad horizontally based on information sensed by the first sensor and adjust the height of the rotatably and pivotally mounted contact support pad based on information sensed by the second sensor.

3. The support equipment of claim 2, wherein the distance sensor includes a third sensor configured to measure a pressure applied to the rotatably and pivotally mounted contact support pad, and
   the supports are each controlled based on information sensed by the third sensor.

4. The support equipment of claim 1, further comprising:
   a landing sensor configured to sense a time at which the reusable rocket lands on the landing platform.

5. The support equipment of claim 1, wherein the supports each include:
   a support member configured to tilt to move the rotatably pivotally mounted contact support pad; and
   an angle adjuster configured to rotatably adjust an inclination angle between the support member and the landing platform,
   the support member and the angle adjusting member are extendable,
   one end of the support member is rotatably hinge-connected to the landing platform platform,
   the other end of the support member is rotatably connected to the rotatably and pivotally mounted contact support pad,
   one end of the angle adjuster is rotatably hinge-corrected to the landing platform, and
   the other end of the angle adjuster is rotatably connected to the support member.

6. The support equipment of claim 1, wherein the supports each include:

a first extension element configured to adjust a height of the rotatably and pivotally mounted contact support pad; and a second extension element configured to adjust an inclination angle of the corresponding support, wherein the first extension element configured to extend such that the rotatably and pivotally mounted contact support pad of each of the supports is located at the s e height, and the second extension element is configured to extend such that the rotatably and pivotally mounted contact support pad moves horizontally.

7. The support equipment of claim 1, wherein the rotatably and pivotally mounted contact support pad is in a form of a roller having a contact face formed of a shock-absorbing material.

8. Support equipment for collecting a reusable rocket, the support equipment comprising:

a transceiver configured to receive information from a reusable rocket;

a controller configured to receive the information from the transceiver and create a command;

a plurality of rotatably and pivotally mounted contact support pads configured to contact the reusable rocket based on the command; and a plurality of movable and extendable supports configured to move and extend separately from the other supports and position and the rotatably and pivotally mounted contact support pads toward the reusable rocket such that each of the contact support pads is located at a same height and spaced apart from one another based on the command of the controller while the reusable rocket is landing, wherein the controller is configured to control movements of the supports and the rotatably and pivotally mounted contact support pads based on a position of the reusable rocket.

9. The support equipment of claim 8, wherein when the reusable rocket is at a landing-detectable height, the controller is configured to control the supports and the rotatably and pivotally mounted contact support pads such that the rotatably and pivotally mounted contact support pads are positioned toward the reusable rocket at predetermined intervals, and to control contacting faces of the rotatably and pivotally mounted contact support pads to face the reusable rocket.

10. The support equipment of claim 8, wherein when the reusable rocket is at a landing-detectable height, the controller is configured to control the supports such that the rotatably and pivotally mounted contact support pads are adjusted to be at the same height, and to control contacting faces of the rotatably and pivotally mounted contact support pads to face the reusable rocket.

11. The support equipment of claim 8, wherein when the reusable rocket lands on a landing platform, the controller is configured to control the supports and the rotatably and pivotally mounted contact support pads such that the rotatably and pivotally mounted contact support pads approach the reusable rocket to secure the reusable rocket.

12. The support equipment of claim 8, wherein the rotatably and pivotally mounted contact support pads are in the form of rollers having contact faces formed of a shock-absorbing material.

* * * * *

UNITED STATES PATENT AND TRADEMARK OFFICE
CERTIFICATE OF CORRECTION

| | | |
|---|---|---|
| PATENT NO. | : 10,703,513 B2 | Page 1 of 1 |
| APPLICATION NO. | : 15/647025 | |
| DATED | : July 7, 2020 | |
| INVENTOR(S) | : Park et al. | |

It is certified that error appears in the above-identified patent and that said Letters Patent is hereby corrected as shown below:

In the Claims

Claim 1, Column 8, Line 16, "other supports and to" should be --other supports, and to--.
Claim 5, Column 8, Line 50, "move the rotatably" should be --move the rotatably and--.
Claim 5, Column 8, Line 58, "landing platform platform," should be --landing platform,--.
Claim 6, Column 9, Line 6, "element configured" should be --element is configured--.
Claim 6, Column 9, Line 8, "at the s e height" should be --at the same height--.

Signed and Sealed this
Twenty-fourth Day of September, 2024

Katherine Kelly Vidal
*Director of the United States Patent and Trademark Office*